United States Patent
Yoshifumi (10) Patent No.: US 10,162,382 B2
(45) Date of Patent: Dec. 25, 2018

(54) APPARATUS, SYSTEMS AND METHODS TO REMOVE HEAT FROM A DEVICE

(71) Applicant: Intel Corporation, Santa Clara, CA (US)

(72) Inventor: Nishi Yoshi Yoshifumi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 15/269,564

(22) Filed: Sep. 19, 2016

(65) Prior Publication Data

US 2018/0081397 A1    Mar. 22, 2018

(51) Int. Cl.
  *G06F 1/20*    (2006.01)
  *G06F 1/16*    (2006.01)
  *G05B 15/02*   (2006.01)

(52) U.S. Cl.
  CPC ........... *G06F 1/1632* (2013.01); *G05B 15/02* (2013.01); *G06F 1/203* (2013.01)

(58) Field of Classification Search
  None
  See application file for complete search history.

(56) References Cited

U.S. PATENT DOCUMENTS

| | | | | |
|---|---|---|---|---|
| 5,937,937 A * | 8/1999 | Sehmbey | ............ | F28D 15/0233 165/104.14 |
| 5,969,939 A * | 10/1999 | Moss | ...................... | G06F 1/203 361/679.41 |
| 6,084,769 A * | 7/2000 | Moore | ..................... | G06F 1/203 165/104.33 |
| 6,115,252 A * | 9/2000 | Ohta | ....................... | G06F 1/203 165/80.4 |
| 7,613,001 B1 * | 11/2009 | Liu | ..................... | H05K 7/20336 165/104.33 |
| 2002/0105783 A1 * | 8/2002 | Kitahara | ............... | G06F 1/1632 361/695 |
| 2003/0011983 A1 * | 1/2003 | Chu | ......................... | G06F 1/203 361/679.47 |
| 2013/0309899 A1 * | 11/2013 | Sehmbey | ................ | G06F 1/203 439/485 |
| 2014/0192480 A1 * | 7/2014 | Winkler | .................. | G06F 1/203 361/679.47 |
| 2014/0376178 A1 * | 12/2014 | Moore | ...................... | G06F 1/20 361/679.53 |
| 2015/0201530 A1 * | 7/2015 | Liu | ..................... | H05K 7/20445 455/575.1 |
| 2017/0222312 A1 * | 8/2017 | Sudo | ........................ | H01Q 1/12 |

FOREIGN PATENT DOCUMENTS

GB    2530664 A   * 11/2014   ............. G06F 1/203

* cited by examiner

*Primary Examiner* — Isaac T Tecklu
(74) *Attorney, Agent, or Firm* — Hanley Flight & Zimmerman, LLC (57) ABSTRACT

Methods, apparatus, systems are disclosed for using a movable heat sink to cool an electrical device during an ejection cycle of the electrical device from a dock. In accord with these concepts, the heat sink is moved from a first position, not in contact with the electrical device, to a second position in physical contact with the electrical device to conduct heat from the electronic device prior to an ejection of an electronic device from the dock.

20 Claims, 7 Drawing Sheets

APPARATUS, SYSTEMS AND METHODS TO REMOVE HEAT FROM A DEVICE

FIELD OF THE DISCLOSURE

This disclosure relates generally to electronic devices and, more particularly to apparatus, systems, and methods to remove heat from a device.

BACKGROUND

Electronic devices utilize a variety of devices, such as processors, that generate heat when operating. Fans are often internally disposed within the computer housing (e.g., case fans) to dissipate heat through convective cooling. Processors often utilize not only an on-board processor heat sink or heat spreader, but also an attendant fan dedicated to convectively cool the heat sink and/or the processor.

Electronic devices, such as computers, conventionally present a number of ports or electrical connectors (e.g., Universal Serial Bus (USB), display port, FireWire, Mini-DVI, Micro-DVI, etc.) through which peripheral devices interface with the computer. The peripheral devices, such as USB flash drives, connected to these ports, are typically not significantly exothermic. Cooling of the peripheral devices is readily achieved simply through packaging design and natural convection, if needed.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Described herein are example embodiments of a heat exchanging device, system and method for cooling an electronic device. In the following description, numerous specific details are set forth to provide an understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

An emerging type of peripheral I/O device is an electronic device classified as a "Micro PC," such as an Intel® Compute Stick, that includes a processor (e.g., an Intel® Core™ m3, M3-6Y30 in the Compute Stick Version STK2M3W64CC) and on-board, non-transient, physical computer-readable memory. These electronic devices further include one or more ports or electrical connectors (e.g., USB 3.0 connector, Micro SD Card Reader Slot, 5V DC Connector, etc.). In operation, the electronic device is connected to a terminal (e.g., a display and keyboard, etc.), via a port having an electrical connector (e.g., a TV/monitor HDMI connector, USB connector, etc.) to enable the processor of the electronic device to transform the terminal into a fully functional computer with WiFi and on-board storage capabilities. The user then interacts with the terminal and any other linked peripheral devices (e.g., Bluetooth-linked mouse and keyboard) as he or she would a conventional computer to work, stream video, play games, or the like. Although the electronic device is connected to a terminal during operation, and is not expected to be exposed to end users during usage, it is expected that the electronic device would be accessed by the user immediately after termination of the terminal session as the user retrieves the electronic device for transport.

Future generations of processor-based electronic devices may present cooling challenges not able to be fully addressed by packaging solutions, convective cooling and/or dynamic frequency scaling ("throttling"). The teachings herein will lower a surface temperature of an electronic device to be accessed by a user for the comfort and/or safety of the user. It is further noted that an unexpected benefit of the present disclosure lies with the expansion of a design envelope for such electronic devices. For example, a rapid lowering of a surface temperature of an electronic device prior to access by a user enables selection and utilization of processors having a slightly higher maximum Tjunction (Tj), synonymous with processor core temperatures, with higher electronic device skin temperatures during operation, to provide greater processing speed and/or capability, while still protecting the user from the higher temperatures.

Figure 1:
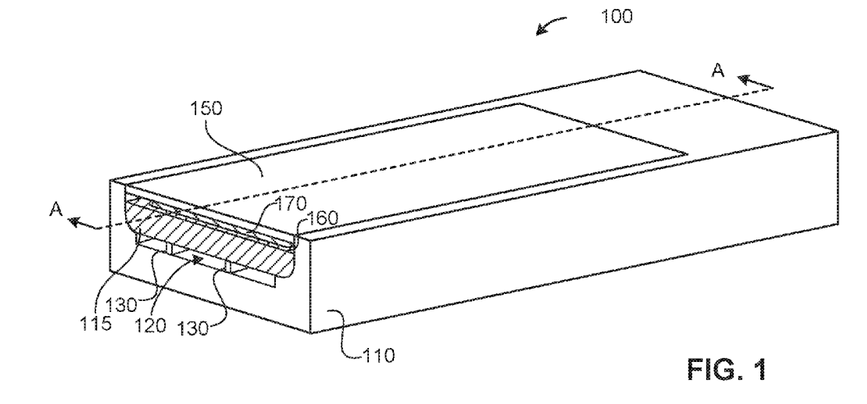
FIG. 1 is a perspective view of an example device disposed within an example dock in accordance with teachings of this disclosure.

FIG. 1 is an isometric view of a portion of an electronics system 100, such as a computer or a display (not shown), including a dock 110. In one example, the dock 110 is a stand-alone docking station removably connectable to one or more electronics systems 100. The dock 110 is dimensioned to receive an electronic device 115, such as a generally credit-card-sized computing device, within a cavity 120 or recess defined by the dock 110. The teachings herein apply equally and without limitation to other configurations and form factors of electronic devices 115 including, but not limited to, the Intel® Compute Stick.

Figure 2:
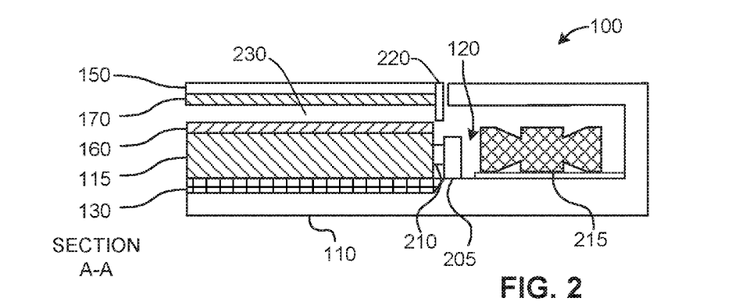
FIG. 2 is a cross-sectional view of the example dock and device of FIG. 1 taken along cross-section A-A in accordance with teachings of this disclosure.

The view of FIG. 1 represents an operational state of the example dock 110, where an example electronic device 115 resides within the example cavity 120, on example support members 130, and an example movable cover 150 or "eject knob assembly" is disposed to at least partially cover the cavity 120. In the example shown, the example electronic device 115 has a form factor of a generally credit-card-sized computing device. FIGS. 1-2 also show a thermally conductive member or heat spreader 160 provided on the upper surface of the electronic device 115 and a heat sink 170 disposed in opposition thereto on a lower surface of the movable cover 150, which are further described below. The movable cover 150 includes an example engagement member(s) 220 projecting therefrom to engage the thermally conductive member 160 and/or electronic device 115 and assist in the physical separation of the electrical connector 210 from the dock electrical connector 205 and/or conveyance of the electronic device 115 at least partially out of the cavity 140 for retrieval by a user. The engagement member 220 is positioned and sized so as not to interfere with an insertion of the electronic device 115 into the dock 110 and, optionally, so as not to introduce untoward torques on the electrical connectors 205, 210 during physical separation of the electrical connectors. In one example, the engagement members 220 include two downwardly projecting fingers, as shown in FIG. 4b, configured to engage the electronic device 115 laterally to the electrical connector 210 following movement of the movable cover 150 toward the electronic device in accordance with the teachings herein.

FIG. 2 is a simplified cross-sectional view of the example dock 110 of FIG. 1 taken along cross-section A-A. An example electronic device 115 is disposed within the example cavity 120 of the dock 110, borne atop support members 130, with the electrical connector 205 connected to electrical connector 210 representing an operational state. In this configuration, the electronic device 115 thermally conductive member 160 is spaced apart from the movable cover 150 heat sink 170. The dock 110 includes one or more electrical connectors 205 (e.g., USB 3.0 female connector) to which a corresponding electrical connector 210 (e.g., USB 3.0 male connector) of an electronic device 115 connects in an operational state, as is shown in FIG. 2 and FIGS. 3a-3d. In various examples, the dock 110 is a stand-alone device removably connectable to an electronics system or is integrated into an electronics system.

As is shown in the example of FIG. 2, an optional cooling system 215 is provided to convectively cool the heat sink 170, as well as the electronic device 115, during operation of the electronic device 115 in the dock 110. In at least some embodiments, the cooling system 215 comprises one or more fans. The cooling system 215 is optionally used during the ejection cycle to convectively cool the heat sink 170 and the thermally conductive member 160.

At least one external surface of the electronic device 115 includes a thermally conductive member or heat spreader 160 to redistribute heat and facilitate removal of heat from underlying electronic devices 115 such as, but not limited to, a processor. In some aspects, the thermally conductive member 160 is an integrated heat spreader (IHS), such as is denoted in FIG. 2, comprising a thermally conductive plate formed from copper. In other aspects, the thermally conductive member 160 includes one or more structures (e.g., fins, surface topography, etc.) that increase a surface area of the thermally conductive member beyond that of a conductive plate. A heat sink 170 and/or the thermally conductive member 160 may comprise any material or materials having a high thermal conductivity such as, but not limited to, one or more of copper, aluminum, silver, an alloy of a plurality of metals, and/or a metal matrix composite such as AlSiC, AlSiC-9, AlSiC-10 or AlSiC-12P. The thermal mass, material(s) and sizing of the thermally conductive member 160 are selected to substantially evenly distribute heat generated by the processor(s) of the electronic device 115 and these variables will vary, as needed, in relation to the thermal design power of the processor(s). The thermal mass, material(s) and sizing of the heat sink 170 are, likewise, selected to provide a predetermined rate of cooling and a predetermined degree of cooling in association with the ejection cycle for at least one configuration of electronic device 115.

In accord with teachings of the disclosure, the heat sink 170 is disposed to move between at least a first position and at least a second position during an ejection cycle of the electronic device 115 from the dock 110. In one example, the first position of the heat sink 170 is spaced apart from the electronic device 115, such as is shown in the operational state of the electronic device 115 in FIG. 2, and the second position is a position at which the heat sink 170 is placed in contact with the thermally conductive member 160 of the electronic device 115, such as is shown in the portion of the ejection cycle represented in FIG. 3b. This contact at the example second position shown in FIG. 3b may occur prior to, or subsequent to, a physical disconnection between the electrical connector 210 and a corresponding dock 110 electrical connector 205. The present disclosure includes a second position occurring at any point during the physical ejection of the electronic device 115.

Once the heat sink 170 is placed in physical contact with the electronic device 115 borne within the dock 110, the heat sink 170 removes heat from the electronic device via conduction. This contact, and corresponding removal of heat from the electronic device 115, is maintained for either a predetermined period of time (e.g., a predetermined period of seconds or fractions thereof), a predetermined path of movement (e.g., during at least a portion of the ejection cycle), and/or until a predetermined condition is satisfied (e.g., a reduction of surface temperature in the electronic device 115 below a threshold, as measured by a temperature sensing device). In the illustrated example of FIG. 2 and FIGS. 3a-3d, for example, the contact between the heat sink 170 and the electronic device 115, or more specifically between the heat sink 170 and the thermally conductive member 160, is maintained from initiation of movement of the electronic device 115 through at least a portion of an ejection cycle and, in one example, through a completion of ejection of the electronic device from the dock 110 (e.g., a point at which the electronic device can be physically removal from the dock).

In accordance with some teachings of the disclosure, the external surface temperature of the electronic device is reduced to a point below about 60° C. (140° F.) before the user is permitted to access and handle the electronic device. In accordance with some teachings of the disclosure, the external surface temperature of the electronic device is reduced to a point below about 55° C. (131° F.) before the user is permitted to access and handle the electronic device. In accordance with some teachings of the disclosure, the external surface temperature of the electronic device is reduced to a point below about 50° C. (122° F.) before the user is permitted to access and handle the electronic device. These temperature reductions are achieved, in at least some examples, by purposing an electronic device dock 110 with a movable heat sink 170 deployable to quickly lower an external surface temperature of an electronic device 115 during an ejection cycle of the electronic device from the dock. In this way, the external surface temperature of the electronic device 115 is rendered safe for handling following a completion of the ejection cycle at a point at which the user is then able to access the electronic device.

As is shown, for example, in FIGS. 2 and 3a-3d, the example heat sink 170 is integrated into the example movable cover 150 of the dock 110. The example movable cover 150 at least partially occludes the opening to the example cavity 140 which bears the electronic device 115 during operation of the electronic device in the dock 110. In this configuration, movement of the movable cover 150 naturally causes a corresponding movement of the heat sink 170. In yet other aspects of the present disclosure, the example heat sink 170 is separate from the movable cover 150 and moved independently of the movable cover.

As is shown, for example, in FIGS. 2 and 3a-3d, the example heat sink 170 or movable cover 150 includes one or more optional engagement members 220 projecting therefrom to engage the thermally conductive member 160 and/or electronic device 115 and assist in the physical separation of the electrical connector 210 from the dock electrical connector 205 and/or conveyance of the electronic device 115 at least partially out of the cavity 140 for retrieval by a user. In one example, the engagement members 220 include two downwardly projecting fingers configured to engage the electronic device 115 laterally to the electrical connector 210 following movement of the movable cover 150 toward the electronic device.

Figure 3A:
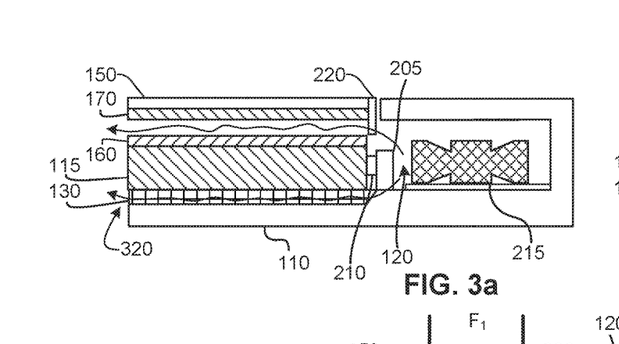
FIGS. 3a-3d are illustrations of aspects of an example dock ejection cycle in accordance with teachings of this disclosure.

FIGS. 3a-3d show a general representation of an ejection cycle of one example of a dock for an electronic device 115 in accord with at least some aspects of the present disclosure. In FIG. 3a, electrical connector 210 is physically and electrically connected to the dock electrical connector 205 in an operational state of the electronic device 115. As shown in FIG. 3a, the operating electronic device 115 generates heat, which is removed by a forced convection cooling system 215 (e.g., one or more fans, etc.) that forces air 320 over the electronic device 115 through air gaps 230 between electronic device 115 and the dock 110, such as between the heat sink 170 and the thermally conductive member 160. In this configuration, the forced convection cooling system 215 thermally separates the heat sink 170 from the electronic device 115 so that the heat sink 170 remains cool.

Figure 3B:
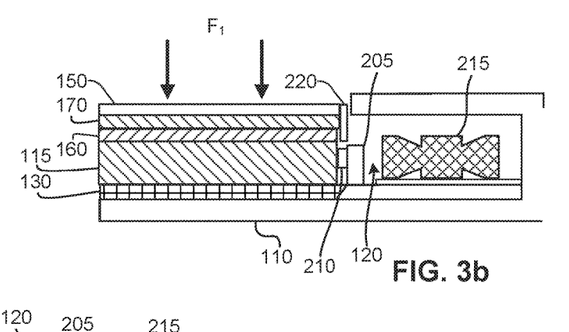

FIG. 3b shows an initiation of an ejection cycle wherein, in the depicted configuration, a downward movement of the cover 150 ("eject knob") responsive to an applied downward force ($F_1$) places the heat sink 170 in contact with the thermally conductive member 160 to cool the thermally conductive member 160. As shown, the engagement members 220 engage the electronic device 115 and/or thermally conductive member 160 as the movable cover 150 is moved into engagement with the electronic device 115.

In accordance with some teachings of the disclosure, an optional locking mechanism (not shown) prevents movement of the electronic device 115 out of the dock 110 until such time as the electronic device external surface temperate is safe for removal, which may be determined by temperature measurements from a temperature sensing device disposed in the dock or lapse of a predetermined period of time known to sufficiently cool the electronic device. The predetermined period of time may be a fixed time, or may vary in accord with variables including, but not limited to, temperature data relative to $T_j$Max output from the processor(s) digital thermal sensor(s) (DTS) contemporaneously to an initiation of an ejection cycle. In general, the time required for cooling of the thermally conductive member 160 using the heat sink 170 will depend on many variables including the initial temperatures of the heat sink and the thermally conductive member before contact, as well as their respective material(s), size and volume ratios, and degree of physical contact therebetween.

Figure 3C:
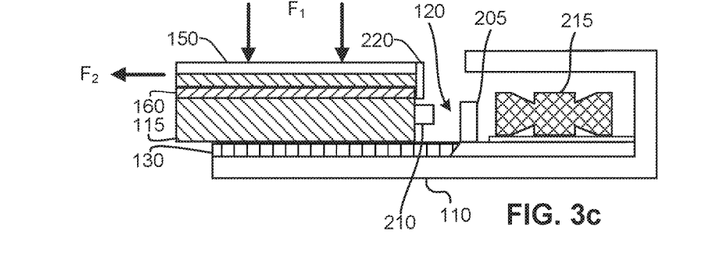

FIG. 3c shows an example point during one example of an ejection cycle wherein the heat sink 170 is maintained in contact with the thermally conductive member 160 of the electronic device 115 as the heat sink 170 and movable cover 150 and electronic device 115 are collectively moved from the second position (e.g., an initial position of the electronic device 115, etc.) to a third position (e.g., a point at which the user is able to access the electronic device, a point of presentment of the electronic device, etc.) responsive to an applied lateral force ($F_2$). As shown in FIG. 3c, the engagement members 220 engage the electronic device 115 and/or thermally conductive member 160 and help to impart the lateral force ($F_2$) to the electronic device 115 to move the electronic device 115 in the direction indicated. In other examples, the engagement between the heat sink 170 and the thermally conductive member 160 of the electronic device 115 is maintained by frictional forces and biasing normal force imparted by the movable cover 150 during movement of the cover (e.g., along a defined path, etc.). In other examples, the engagement between the heat sink 170 and the thermally conductive member 160 of the electronic device 115 is maintained by interaction of one or more engagement members on the movable cover 150 and/or the heat sink 170 (e.g., spring-biased projecting members) that engage corresponding features on at least one of the thermally conductive member 160 and/or the electronic device 115 (e.g., recessions) along a portion of the ejection cycle, but that disengage or are forced to disengage at another portion of the ejection cycle.

Figure 3D:
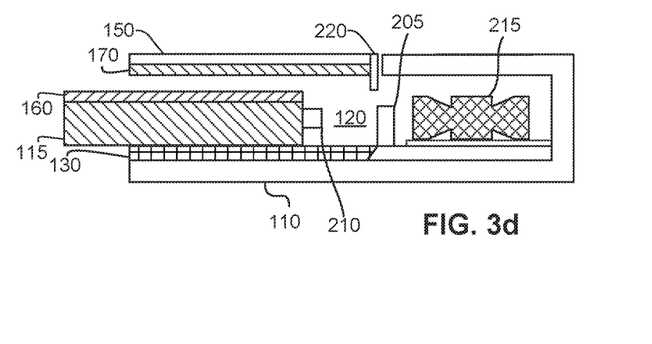

FIG. 3d shows a point during the ejection cycle at which the heat sink 170 and movable cover 150 have separated from the thermally conductive member 160 of the electronic device 115 and have returned (e.g., biased by a spring, manually moved by a user, driven by an actuator, etc.) to the initial position, exposing the electronic device for access by the user.

In accordance with some teachings of the disclosure, the first position or original position at which the heat sink 170 is maintained during operation of the electronic device 115 within the dock 110 may comprise a position that is in opposition to and spaced apart from the thermally conductive member 160, such as is represented in FIGS. 2 and 3a-3d. In other examples, the heat sink 170 may be disposed in another position (e.g., displaced laterally and/or longitudinally relative to the thermally conductive member 160) and may even be disposed outside of the cavity 140 during operation. Similarly, the second position at which the heat sink 170 initially engages the thermally conductive member 160 of the electronic device 115 may comprise any point between and including an initial position of the electronic device in the dock 110 to a point at which the electronic device 115 is presented to the user for removal.

In various other teachings of the disclosure, the ejection knob comprising the movable cover 150 and heat sink 170 moves only along one axis (e.g., vertically in the depiction of FIG. 3b) into engagement with the electronic device 115 while the electronic device is maintained in a fixed position. In one example, one or more resilient biasing elements (e.g., spring) are attached to the movable cover 150 to bias the movable cover into the first position shown in FIG. 3a and application of the vertical force $F_1$ as shown in FIG. 3b is required to overcome the action of the one or more resilient biasing elements. Following completion of conductive cooling of the thermally conductive member 160, the ejection knob comprising the movable cover 150 and heat sink 170 is moved out of engagement with the electronic device 115 (e.g., allowing the movable cover 150 to move vertically away from the electronic device under the action of the one or more resilient biasing elements). Following such disengagement, the electronic device 115 is free to be moved by an ejection mechanism to a point at the electronic device is presented to the user for removal.

Figure 4A:
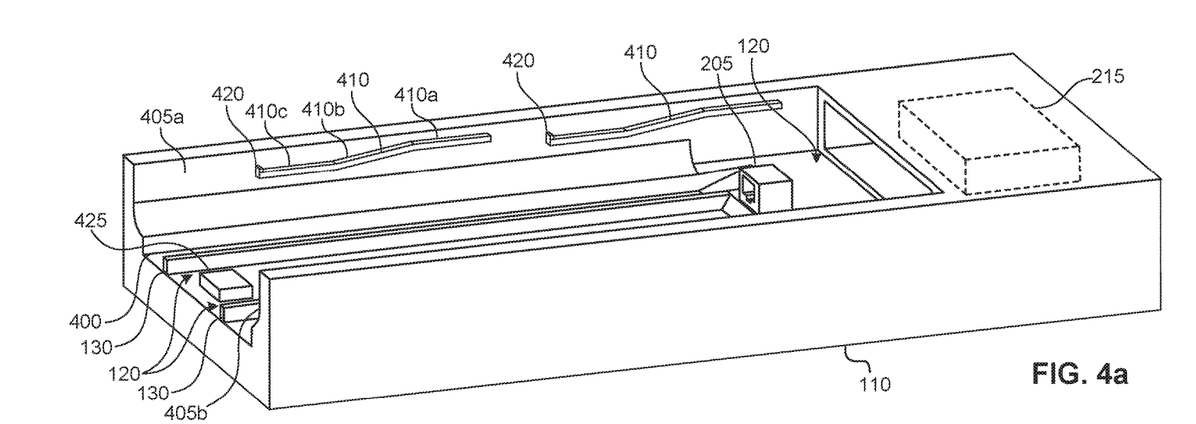
FIG. 4a is a perspective view of the example dock and device of FIG. 2 with an example cover removed to show example guides disposed in the dock to guide movement of the cover in accordance with teachings of this disclosure.
Figure 4B:
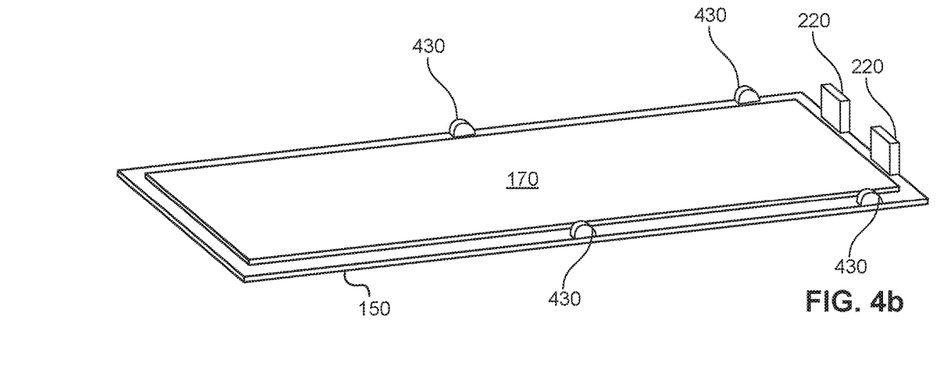
FIG. 4b is a perspective view of an example cover for the example dock of FIG. 4a in accordance with teachings of this disclosure.

FIG. 4a is a perspective view of the dock 110 of FIG. 1 wherein the movable cover 150 removed to show guide members 410 disposed in the dock 110 to guide movement of the movable cover 150 in accordance with some teachings of the disclosure. The guide members 410 comprise, in various aspects, rails and/or slots formed in a sidewall 405a, 405b of the cavity 140 of dock 110 (e.g., cantilevered) and, more preferably, in both sidewalls 405a, 405b.

As shown in the example of FIG. 4a, the guide members 410 are generally curvilinear in profile and are configured to constrain motion of the movable cover 150 along a predefined path in the dock 110. To facilitate positioning of the electronic device 115 in the cavity while maintaining air flow pathways, a floor 400 or base of the cavity 140 includes support members 105 (e.g., rails, etc.) on which the electronic device 115 may rest and slide. The support members 105 are advantageously positioned so that application of a vertical force $F_1$ to bias the movable cover 150 and movable heat sink 170 into engagement does not rotate the electronic device 115 relative to the dock electrical connector 205, which could cause undesired stress at the electrical connectors 205, 125.

A first portion 410a of the guide members 410 is substantially parallel to the floor 400 or base of the cavity 140 and extends in a direction of an opening of the cavity 140. Consequently, initial motion of the movable cover 150 is substantially parallel to the electronic device 115. In another example, this portion of the guide members 410 may be omitted.

A second portion 410b of the guide members 410 angles downwardly, toward the floor 400, from the first portion 410. This second portion 410b constrains motion of the movable cover 150 along a path that is directed toward an electronic device 115 disposed in the cavity so that the heat sink 170 attached to, or integrated with, the movable cover 150 is directed toward and into contact with the electronic device 115. In the example where the first portion 410a of the guide members 410 is omitted, an upper portion of the second portion 410b of the guide members 410 is advantageously provided with a detent to lock the movable cover 150 in position once the movable cover 150 is in an appropriate operational position. In such configuration, the initial movement of the movable cover 150 is toward the electronic device 115.

At portion 410c of the guide members 410, the movable cover 150 heat sink 170 is in direct contact with the electronic device 115 or thermally conductive member 160. Additionally, at or near portion 410c, the engagement members 220 enter into engagement with the electronic device 115 and/or the thermally conductive member 160 to apply lateral forces thereto (e.g., $F_2$ as shown in FIG. 3c) to disengage the electrical connector 210 from the dock electrical connector 205 and to laterally move the electronic device 115 toward the opening of the cavity 140. Following the transition from portion 410b to 410c of the guide members 410, subsequent coordinated movement of the movable cover 150, heat sink 170, and the electronic device 115 follows the path defined by portion 410c that is substantially parallel to the floor 400 of the cavity 140 parallel to and in a direction of an opening of the cavity 140.

Figure 5:
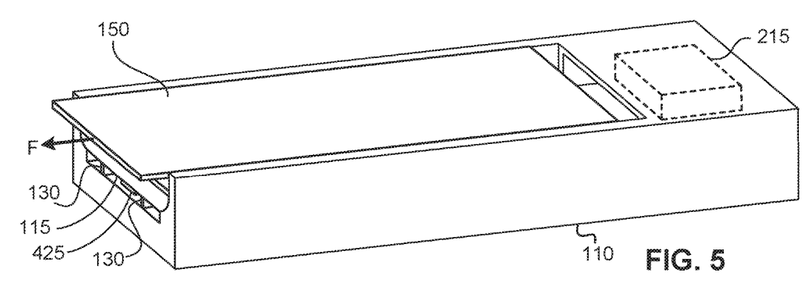
FIG. 5 is a perspective view of the example dock of FIGS. 4a-4b showing a first example aspect of movement of the example cover along the example guides of FIGS. 4a-4b in accordance with teachings of this disclosure.

Although not shown in FIG. 5, one or more correspondingly-shaped guide members 410 are provided on the sidewall 405b of cavity 140. In one example, a single correspondingly-shaped guide member (not shown) is disposed in opposition to the guide member 410 on the sidewall 405a. In another example, two correspondingly-shaped guide members 410 are disposed, in a spaced apart relation, on the sidewalls 405a, 405b so that two pairs of guide members are provided defining two sets of tracks. Projections or features configured to engage the guide members 410 (e.g., extending pins, etc.) are provided on the movable cover 150 to travel within the tracks. For example, where the guide members 410 comprise rails, as shown in FIG. 4a, projections or features 430 are formed on or attached to the movable cover 150, as shown in FIG. 4b, to cooperatively engage, and remain on, the guide members 410. As another example, the guide members 410 comprise slots formed in sidewalls 405a, 405b of the dock cavity 140 and the projections or features on the movable cover 150 constitute features (e.g., pins) configured to cooperatively engage, and remain within, the slots.

Stop members 420 are advantageously formed in, integrated with, or installed near an end of the portion 410c of the guide members 410 to interact with the projections or features 430 are formed on or attached to the movable cover 150 (see FIG. 4b) to stop continued lateral movement of the movable cover 150 past a predetermined point.

In yet another aspect, the guide members 410 may be vertically oriented in the sidewalls 405a, 405b to provide a path for vertical movement of the movable cover 150 (i.e., vertically toward and away from the electrical device 150). In such configuration, the movable cover 150 is depressed against a spring force to place the heat sink 170 into contact with the electrical device 150 or thermally conductive member 160, wherein the movable cover or heat sink 170 is then maintained in place (e.g., latched in place, biased under a constant force $F_1$, etc.) to maintain the heat sink in contact with the electrical device 150 or thermally conductive member 160 for a sufficient period of time to conductively cool the electronic device. In some aspects, when the electronic device 115 is determined to be cooled sufficiently (e.g., by output of a thermal sensor, a lapse of a predetermined amount of time, etc.), a dock control system is configured to disengage a latch holding the heat sink 170 in contact with the electrical device 150 or thermally conductive member 160 and allow the movable cover 150 and heat sink 170 to move away from the electrical device under the bias of the spring force. This would then free the electrical device 150 for conveyance by an ejection mechanism outwardly toward an opening of the cavity 140 to a position where a portion of the electrical device is sufficiently exposed for removal by a user.

FIG. 5 shows a perspective view of the dock 110 of FIGS. 4a-4b wherein the movable cover 150 has been moved along the guide members 410 by a force F in a direction of the arrow to depict a first aspect of movement of the cover along the guide members in accordance with some teachings of the disclosure. The movement along the path depicted, substantially parallel to a floor 400 of the cavity 140 and in a direction of an opening of the cavity 140, corresponds to movement of the movable cover along the first portion 410a of the guide members 410.

Figure 6:
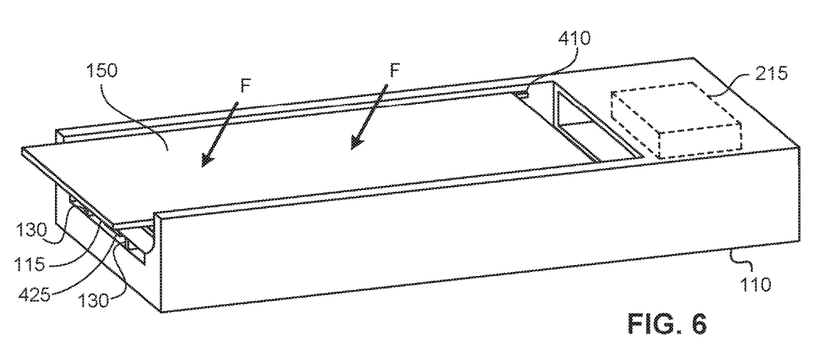
FIG. 6 is a perspective view of the example dock of FIGS. 4a-4b showing a second example aspect of movement of the example cover along the example guides of FIGS. 4a-4b in accordance with teachings of this disclosure.

FIG. 6 is a perspective view of the dock of FIGS. 4a-4b showing a second aspect of movement of the cover along the guides of FIGS. 4a-4b in accordance with some teachings of the disclosure. Specifically, the state represented in FIG. 6 corresponds to a point in the ejection cycle subsequent to that depicted in FIG. 5, where the movable cover 150 has transitioned from movement along the first portion 410a of the guide members to movement along the second portion 410b of the guide members. As shown applied force vector F, indicated by the arrows, the movable cover 150 is guided by the second portion 410b of the guide members 410 toward the electronic device 115 (not shown in FIG. 6). At some point during travel of the movable cover 150 along the second portion 410b of the guide members 410 (e.g., a middle third of travel on the second portion 410b of the guide members, a final third of travel on the second portion 410b of the guide members, etc.), the heat sink 170 (not shown in FIG. 6) contacts the electronic device 115, as is shown in FIGS. 3a-3d.

Figure 7:
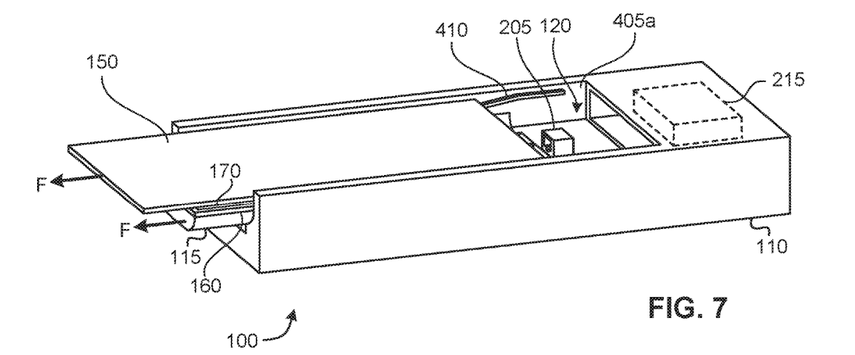
FIG. 7 is a perspective view of the example dock of FIGS. 4a-4b showing a third example aspect of movement of the example cover along the example guides of FIGS. 4a-4b in accordance with teachings of this disclosure.

FIG. 7 is a simplified perspective view of the dock of FIGS. 4a-4b showing a third aspect of movement of the movable cover 150 along the guide members 410 of FIGS. 4a-4b in accordance with some teachings of the disclosure. Specifically, the state represented in FIG. 7 corresponds to a point in the ejection cycle subsequent to that depicted in FIG. 6, where the movable cover 150 has transitioned from movement along the second portion 410b of the guide members to movement along the third portion 410c of the guide members 410. As shown by the direction of the arrow, the movable cover 150 is moved along the third portion 410c of the guide members 410 responsive to the force vectors F in a direction substantially parallel to a floor 400 of the cavity 140 and in a direction of an opening of the cavity 140. The electronic device 115 is shown to be conveyed by the movable cover 150 and heat sink 170.

Thus, in accord with the operations in FIGS. 6-7 and, correspondingly, those depicted in FIGS. 3b-3d, the heat sink 170 is maintained in contact with the electronic device 115 for a predetermined period of time during the ejection cycle, such predetermined time being governed by a velocity of the movable cover 150 along the guide members 410 and associated dwell time. In at least some of the aforementioned aspects of the dock 110 and movement of the movable cover 150 and heat sink 170 relative thereto and relative to a position occupied by an electronic device 115 (e.g., a Compute-Card, a Compute-Stick, an external processing device, etc.) disposed within a cavity 140 of the dock 110, the movement of the movable cover 150 and heat sink 170 is manually-controlled by a user. In such aspects, a biasing force is optionally, but advantageously, applied to the movable cover 150 to retard motion of the cover, such as through one or more springs and/or dampers, to slow a potential rate of movement.

In other aspects, a dock 110 controller controls a drive system 155, which in turn controls movement of a drive 156 (e.g., belt drive(s), linear actuator(s), linkage(s), etc.) engaging and moving the movable cover 150 and/or heat sink 170. So configured, the controller ensures that the physical ejection cycle of an electronic device 115 is only completed, and the electronic device made available to a user, after an external temperature of the electronic device to be ejected from the dock 110 is below a predetermined temperature (e.g., below about 60° C., below about 55° C., below about 50° C., etc.).

In some aspects, the control of the ejection cycle is independent of any actual measurement of an external temperature of the electronic device 115 or temperature corresponding thereto. In other aspects, the controller premises movement of the movable cover 150 and/or heat sink 170 on an output to the controller of temperature-related signals from one or more temperature sensor(s) 425 configured to sense a temperature of the electronic device 115 or a temperature relating thereto. By way of example, as noted above, the temperature-related signals are output from the processor(s) digital thermal sensor(s) (DTS) contemporaneously to an initiation of an ejection cycle. This informs the dock controller as to a degree of cooling required to occur during the ejection cycle. For example, if the electronic device 115 was largely quiescent for 30 minutes prior to ejection, a relatively short cooling period (e.g., a fraction of a second to one second) would be required, whereas if the electronic device was subjected to heavy usage immediately prior to initiation of ejection, a relatively longer cooling period would be required (e.g., between one to two seconds).

In view of the above, it can be seen that one method of conditioning an electronic device for removal from a dock in accord with the concepts disclosed herein, includes the acts of (1) moving a heat sink 170 from a first position adjacent and spaced apart from the electronic device 115 to a second position abutting the electronic device; (2) using the heat sink 170 to conductively remove thermal energy from the electronic device 115 and lower an external temperature of the electronic device; and (3) moving the heat sink 170 away from the electronic device 115 following at least one of a lapse of a predetermined period of time, a completion of a predetermined movement of the heat sink and electronic device while they are in abutment with one another, or an attainment of an external temperature of the electronic device below a predetermined threshold temperature. Such method further optionally, but advantageously, includes the act of electrically disconnecting the electronic device 115 from the dock 110 electrical connector 205 prior to or contemporaneously with the movement of the heat sink 170 from the first position to the second position.

Figure 8:
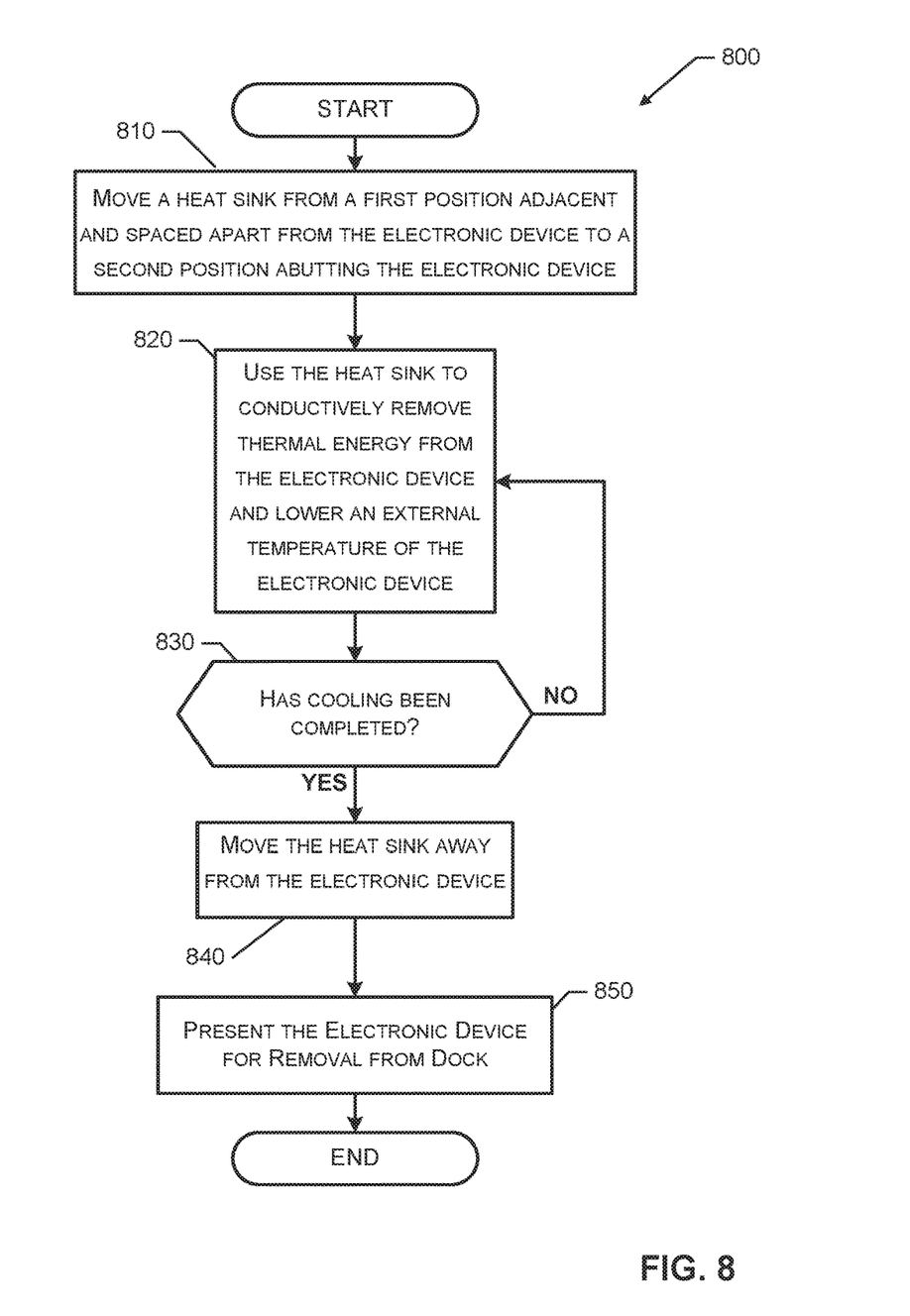
FIG. 8 shows a flowchart in accordance with teachings of this disclosure.

FIG. 8 shows a flowchart of an example method 800 performed in accordance with some teachings of the disclosure. A first act 810 includes moving a heat sink 170 from a first position adjacent and spaced apart from the electronic device 115 to a second position abutting the electronic device, such as is shown by way of example in FIG. 3b or FIG. 6. A second act 820 includes using the heat sink 170 to conductively remove thermal energy from the electronic device 115 and lower an external temperature of the electronic device. A third act 830 includes determining whether the heat sink 170 has sufficiently cooled the electronic device 115 to lower an external temperature of the electronic device to a predetermined acceptable level. In a fourth act 840, the heat sink 170 is moved away from the electronic device 115. The electronic device 115 is then presented, in act 850, for removal from the dock 110.

In one example, the third act 830 itself includes a number of different potential determinations. In one example, the third act 830 includes the acts of determining whether a predetermined period of time has lapsed, determining whether a predetermined movement has been completed, and/or determining whether a predetermined threshold temperature has been reached following the initiation of the use of the heat sink 170 to conductively remove thermal energy from the electronic device 115 in the second act 820.

In accord with some aspects of the concepts disclosed herein, a controller is used to implement act(s) 830 to determine whether a condition precedent to moving the heat sink away from the electronic device has been satisfied. For example, such controller can determine whether a predetermined period of time has lapsed, a predetermined movement has been completed, and/or a predetermined threshold temperature has been reached following the initiation of the use of the heat sink 170 to conductively remove thermal energy from the electronic device 115 in the second act 820. If a designated one of these conditions has not been satisfied (e.g., any one of the acts mentioned above in relation to act 830), the second act 820 continues to be implemented, with successive determinations of the state of the condition until such time as the condition is satisfied. Once the designated condition(s) is (are) satisfied in the respective ones of act(s) 830, the heat sink 170 and movable cover 150 are moved away from the electronic device 115 in act 840, back to the starting position, and the electronic device is presented for removal from the dock 110 in act 850, effectively completing the ejection cycle.

Figure 9:
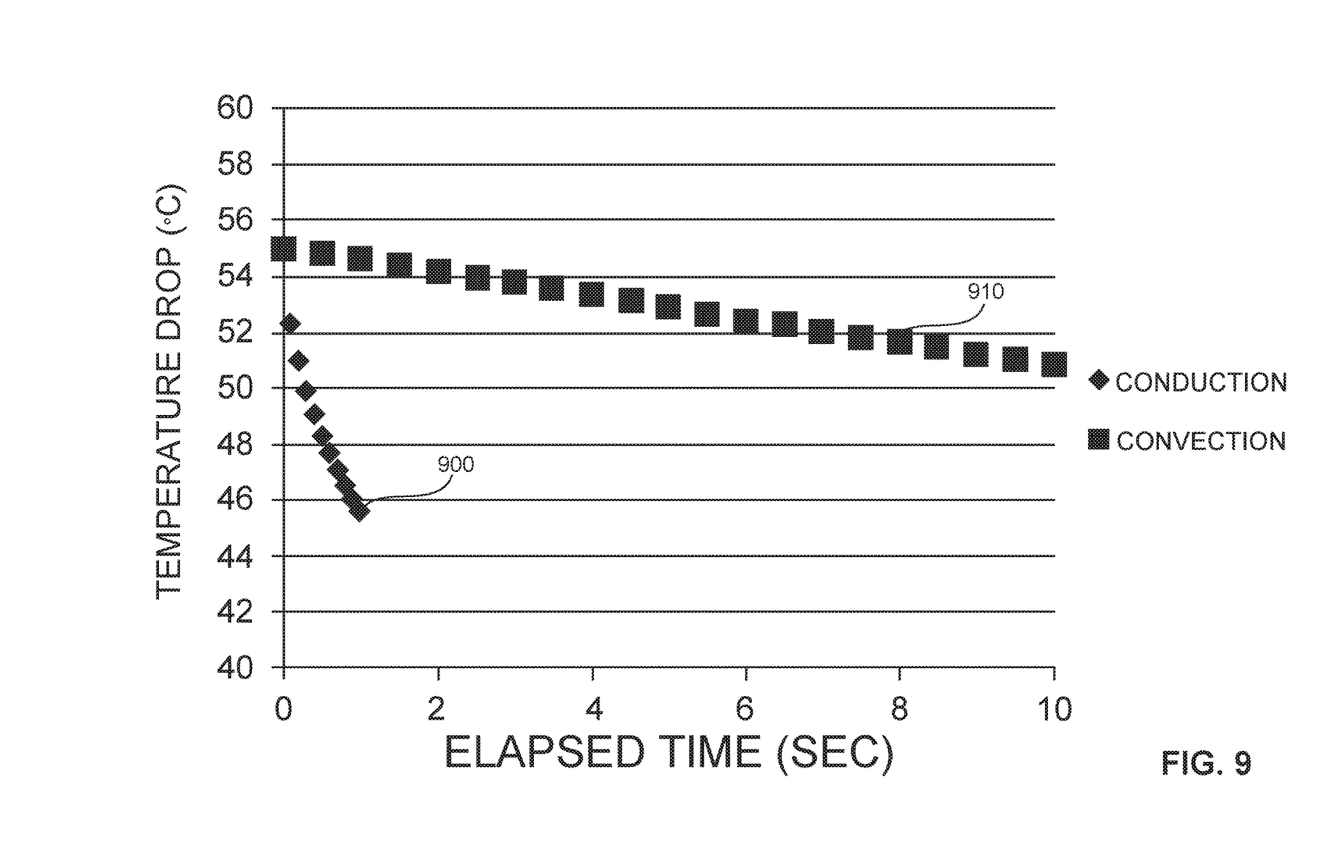
FIG. 9 is a plot showing modeled temperature changes due to conductive heat transfer and convective heat transfer over time for a credit card sized plate.

FIG. 9 shows results of a simulation illustrating the dramatic difference between the conductive cooling operation disclosed herein and the conventional approach of convective cooling. FIG. 9 shows transient simulation results for 86 mm×54 mm×1 mm copper plate (e.g., simulated thermally conductive member 160) with an initial temperature 55° C. and no power dissipation. The conduction model, plot 900, assumes direct contact with another copper plate of the same size (e.g., simulated heat sink 170) at initial temperature of 25° C. A 0.2 mm thick rubber (0.2 W/m-K), simulating an electronic device 115 housing, is taken to be disposed between the two plates. In this simulation, there is no external heat dissipation and only energy exchange via conduction between the plates is modeled. More realistic assumptions, such as external airflow, and/or larger sink plate, would be expected to show an even faster temperature drop than is shown in FIG. 9. The convection model, plot 910, assumes 1.0 CFM airflow @ 25° C. around the plate. According to the transient simulation results of FIG. 9, it is possible to lower the temperature of a card by nearly 10° C. in just about one second using the conductive cooling in accord with the concepts disclosed herein, whereas meaningful temperature reduction cannot be achieved using convective cooling (a difference of only about 4° C.) even in 10 seconds. The conventional wisdom, to direct air over hot surfaces to provide cooling, is a time consuming process and meaningful temperature reduction can only happen on the order of tens of seconds. Utilization of thermal conduction during a dock ejection cycle in accord with aspects of the concepts disclosed herein transfers heat much faster than convection and can achieve meaningful temperature reductions in external temperature of electronic devices in a very short period of time (e.g., one second, a few seconds, etc.).

Figure 10:
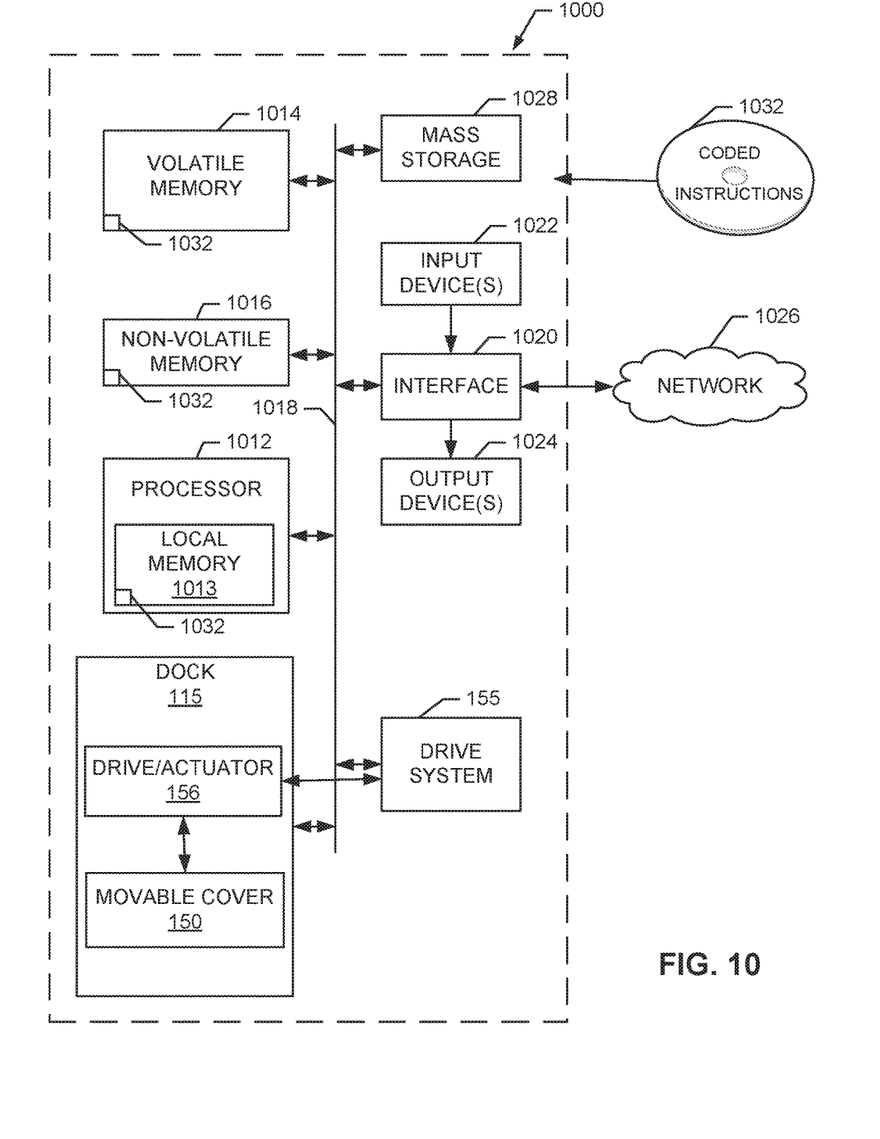
FIG. 10 is a block diagram of an example processor platform which may execute the example instructions, such as instructions implementing the flowchart in FIG. 8, to implement concepts disclosed herein.

While an example manner of implementing the acts of the example set forth in FIG. 9 is illustrated in FIG. 10, one or more of the elements, processes and/or devices illustrated in FIG. 10 may be combined, divided, re-arranged, omitted, eliminated and/or implemented in any other way. Further, the example of FIG. 9 may be implemented by hardware, software, firmware and/or any combination of hardware, software and/or firmware. Thus, for example, the example dock ejection control of FIG. 9, or other examples expressly or implicitly disclosed herein could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the examples illustrated in FIGS. 1-9 are hereby expressly defined to include a tangible computer readable storage device or storage disk such as a memory, a digital versatile disk (DVD), a compact disk (CD), a Blu-ray disk, etc. storing the software and/or firmware. Further still, the example of FIG. 9 may include one or more elements, processes and/or devices in addition to, or instead of, those illustrated in FIG. 10, and/or may include more than one of any or all of the illustrated elements, processes and devices.

A flowchart representative of example machine readable instructions for implementing the apparatus 100 of FIGS. 1-8 is shown in FIG. 10. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example dock 110 and example heat sink 170 may alternatively be used. For example, the order of execution of the blocks may be changed, and/or some of the blocks described may be changed, eliminated, or combined.

As mentioned above, the example process of FIG. 9, or other processes disclosed herein, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 9, or other processes disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

As noted above, FIG. 10 is a block diagram of an example processor platform 1000 capable of executing the instructions of the example program 800 of FIG. 8. In various aspects, the processor platform 1000 is, by way of example, a server, a desktop computer, a laptop computer, television, display device, port replicator, terminal, mobile device (e.g., a tablet computer, such as an iPad™), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 represented generally in FIG. 8, or in any other methods and processes disclosed herein, may be stored in the mass storage device 1028, in the volatile memory 1014, in the non-volatile memory 1016, and/or on a removable tangible computer readable storage medium such as a CD or DVD.

It is to be further noted that, although FIG. 10 represents one possible configuration of elements and systems that may be advantageously utilized in combination with the dock 110 disclosed herein, in accordance with some teachings of the disclosure present a dock that is manually operated by a user without any attendant control systems or automation. In such examples, the user manually slides and depresses the cover 150 to engage the heat sink 170 with the electronic device 115 as part of the ejection process. By virtue of this physical contact between the heat sink 170 with the electronic device 115, and the time required for the user to manually manipulate the cover 150 to complete an ejection of the electronic device, the electronic device is conductively cooled by the heat sink to better facilitate safe handling of the electronic device by a user.

In some aspects, in lieu of a control system controlling an ejection cycle of an electronic device 115 from a dock 110 responsive to, for example, temperature measurements relating to an external temperature of the electronic device 115, temperature-related signals from one or more temperature sensor(s) configured to sense a temperature of the electronic device 115, or a temperature relating thereto, are provided to a dock lighting circuit (not shown). In one example, a dock lighting circuit is configured to provide a visual indication of temperature to a user to inform the user as to a temperature of the electronic device 115, such as by using a temperature-related signal (e.g., voltage) below a certain threshold (e.g., 50° C.) to cause an illumination of a green light to indicate to the user the electronic device is ready to be removed.

While the examples described above generally relate to an example movable cover 150 moving downwardly to place an example heat sink 170 in contact with an example thermally conductive member 160 of an example electronic device 115, the disclosed concepts include additional variants of the general concept of cooling an electronic device during at least a portion of an ejection cycle of the electronic device from a dock. As another example, during an ejection cycle, the example electronic device 115 is moved upwardly to place the example thermally conductive member 160 in contact with the example heat sink 170 of the movable cover 150. In yet another example, during an ejection cycle, the example electronic device 115 is moved upwardly to place the example thermally conductive member 160 in contact with the example heat sink 170 disposed on a stationary cover. In still another example, the example movable cover 150 is to move upwardly to place the example heat sink 170 in contact with the example electronic device 115. In another example, a plurality of movable heat sinks 170 are provided (e.g., a first movable heat sink above the example electronic device 115 and a second movable heat sink below the example electronic device 115) to move to come into contact with the example electronic device 115 to cool the electronic device 115 during at least a portion of an ejection cycle of the electronic device from a dock.

Example 1 is an electronics system including a dock defining a cavity dimensioned to receive an electronic device, a movable heat sink configured to move at least between a first position and a second position relative to the dock during an ejection cycle of the dock and a dock electrical connector to which an electronic device connects. During an operational state of an electronic device in the dock, the movable heat sink is disposed in the first position which is spaced apart from the electronic device. In conjunction with an ejection cycle for the electronic device, the movable heat sink is disposed in the second position to place it in contact with the electronic device to conduct heat from the electronic device prior to ejection of the electronic device from the dock and, following a completion of the ejection cycle, the movable heat sink is returned to the first position.

Example 2 includes the electronics system as defined in Example 1, wherein the movable heat sink is further configured to move from the second position to a third position relative to the dock during an ejection cycle.

Example 3 includes the electronics system as defined in Example 2, wherein the dock includes guide members defining a path along which the movable heat sink moves from the first position to the second position and to the third position.

Example 4 includes the electronics system as defined in Example 1, wherein, following completion of an ejection cycle, the movable heat sink is returned to the first position.

Example 5 includes the electronics system as defined in Example 1, wherein the dock includes a cooling system adapted to convectively transfer heat from the cavity during operation of the dock when the movable heat sink is disposed in the first position.

Example 6 includes the electronics system as defined in Example 1, wherein the dock includes a movable cover, and wherein the movable heat sink is integrated with the movable cover.

Example 7 includes the electronics system as defined in Example 6, wherein the movable heat sink includes at least one of a copper plate, an aluminum plate, an aluminum alloy, a copper alloy, an alloy of a plurality of metals, or a metal matrix composite.

Example 8 includes the electronics system as defined in Example 6, further including a controller and a drive system to move the movable cover and the movable heat sink relative to at least one of the electronic device and the dock, wherein the controller controls movement of the movable cover and the movable heat sink via the drive system.

Example 9 includes the electronics system as defined in Example 8, further including a temperature sensor configured to sense a temperature of the movable heat sink or the electronic device borne by the dock and to output the sensed temperature to the controller, wherein the controller is configured to use the drive system to complete a physical ejection cycle of the electronic device only after the temperature sensor indicates an external temperature of the electronic device is below about 50° C.

Example 10 includes the electronics system as defined in Example 8, wherein the controller is configured to, via the drive system, maintain the movable heat sink in the second position for a predetermined period of time during the ejection cycle.

Example 11 includes the electronics system as defined in Example 10, wherein the predetermined period of time is selected to ensure an external temperature of the electronic device ejected from the dock is below about 50° C.

Example 12 includes the electronics system as defined in Example 1, wherein the movable heat sink is configured to be manually moved along a path from the first position to the second position and from the second position back to the first position.

Example 13 includes the electronics system as defined in Example 1, wherein the movable heat sink is positioned, in the second position, to contact a thermally conductive member of the electronic device.

Example 14 includes the electronics system as defined in Example 1, further including an electronic device, including an electrical connector, physically connected to the dock electrical connector.

Example 15 includes the electronics system according to Example 14, wherein the electronic device includes a processing device.

Example 16 includes the electronics system according to Example 14, wherein the electronic device includes a compute-card or a compute-stick.

Example 17 is a dock for an electronic device including a cavity bearing an electrical connector, the cavity and the electrical connector being adapted to receive an electronic device, and a movable heat sink configured to move at least between a first position and a second position relative to the dock during an ejection cycle of an electronic device from the dock. The first position corresponds to an operational state of an electronic device borne by the dock electrical connector and the movable heat sink is spaced apart from an electronic device borne by the dock electrical connector and the second position corresponds to an ejection cycle of an electronic device borne by the dock electrical connector and the movable heat sink is disposed to contact an electronic device borne by the dock electrical connector to conduct heat from the electronic device following electrical disconnection of the electronic device from the dock electrical connector in association with the ejection cycle.

Example 18 includes the dock as defined in Example 17, wherein the movable heat sink is further configured to move from the second position to a third position relative to the cavity during an ejection cycle.

Example 19 includes the dock as defined in Example 18, wherein the dock includes guide members defining a path along which the movable heat sink moves from the first position to the second position and to the third position.

Example 20 includes the dock as defined in Example 17, wherein, following completion of an ejection cycle, the dock heat sink is returned to the first position.

Example 21 includes the dock as defined in Example 17, wherein the dock includes a cooling system adapted to convectively transfer heat from the cavity during operation of the dock when the movable heat sink is disposed in the first position.

Example 22 includes the dock as defined in Example 17, wherein the dock includes a movable cover and wherein the movable heat sink is integrated with the movable cover.

Example 23 includes the dock as defined in Example 22, wherein the movable heat sink includes at least one of a copper plate, an aluminum plate, an aluminum alloy, a copper alloy, an alloy of a plurality of metals, or a metal matrix composite.

Example 24 includes the dock as defined in Example 22, further including a controller and a drive system to move the movable cover and the movable heat sink relative to at least one of the electronic device and the dock, wherein the controller controls movement of the movable cover and the movable heat sink via the drive system.

Example 25 includes the dock as defined in Example 24, further including a temperature sensor configured to sense a temperature of the movable heat sink or the electronic device borne by the dock and to output the sensed temperature to the controller, wherein the controller is configured to use the drive system to complete a physical ejection cycle of the electronic device only after the temperature sensor indicates an external temperature of the electronic device is below about 50° C.

Example 26 includes the dock as defined in Example 24, wherein the controller is configured to, via the drive system, maintain the movable heat sink in the second position for a predetermined period of time during the ejection cycle.

Example 27 includes the dock as defined in Example 26, wherein the predetermined period of time is selected to ensure an external temperature of the electronic device ejected from the dock is below about 50° C.

Example 28 includes the dock as defined in Example 17, wherein the movable heat sink is configured to be manually moved along a path from the first position to the second position and from the second position back to the first position.

Example 29 includes the dock as defined in Example 17, wherein the movable heat sink is positioned, in the second position, to contact a thermally conductive member of the electronic device.

Example 30 includes the dock as defined in Example 17, further including an electronic device, including an electrical connector, physically connected to the dock electrical connector.

Example 31 includes the dock as defined in Example 30, wherein the electronic device includes a processing device.

Example 32 includes the dock as defined in Example 30, wherein the electronic device includes a compute-card or a compute-stick.

Example 33 is a method of conditioning an electronic device for ejection from a dock, the method including the acts of following receipt of an ejection input, moving a dock heat sink from a first position spaced apart from the electronic device to be ejected to a second position abutting the electronic device, using the dock heat sink to conductively remove thermal energy from the electronic device and lower an external temperature of the electronic device, moving the dock heat sink away from the electronic device following at least one of a lapse of a predetermined period of time, a completion of a predetermined movement of the dock heat sink and electronic device while they are in abutment with one another, or an attainment of an external temperature of the electronic device below a predetermined threshold temperature, presenting the electronic device for removal and returning the dock heat sink to the first position following removal of the electronic device from the dock.

Example 34 includes the method as defined in Example 33, wherein a cooling system operates to transfer heat from the dock heat sink when the dock heat sink is disposed in the first position during electrical connection of the electronic device to the dock.

Example 35 includes the method as defined in Example 33, wherein the completion of the predetermined movement includes movement of the dock heat sink and electronic device in abutment therewith along a path defined by structural elements of the dock from the second position to a third position, and wherein the third position presents the electronic device for removal from the dock.

Example 36 includes the method as defined in Example 33, wherein the dock includes a movable cover, wherein the dock heat sink is integrated with the movable cover, and wherein the movable cover is constrained to move along a path defined by structural elements of the dock from at least one of the first position to the second position and the second position to the third position.

Example 37 includes a dock for an electronic device including a cavity bearing an electrical connector, the cavity and the electrical connector being adapted to receive an electronic device and a movable heat sink means for conducting heat from an electronic device during removal of the electronic device from the dock.

Example 38 includes the dock as defined in claim 37, wherein the movable heat sink means is movable during an ejection cycle of an electronic device from the electrical connector from at least a first position spaced apart from the electronic device to a second position contacting the electronic device.

Example 39 includes the dock as defined in claim 37, wherein the dock includes guide means for guiding a motion of the movable heat sink means.

Example 40 includes the dock as defined in claim 38, wherein, following completion of an ejection cycle of the electronic device from the port, the movable heat sink means is returned to the first position.

Example 41 includes the dock as defined in claim 38, wherein the dock includes a cooling means to convectively transfer heat from the cavity during operation of the dock when the movable heat sink means is disposed in the first position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A dock to receive an electronic device, the dock comprising:
   a cavity dimensioned to receive the electronic device;
   a dock electrical connector to engage the electronic device;
   a movable heat sink to move between at least (a): a first position in which the heat sink is to be spaced apart from the electronic device, and (b): a second position in which the heat sink is to contact at least one of the electronic device or a thermally conductive structure carried by the electronic device;
   a temperature sensor to sense a temperature of at least one of the movable heat sink, the thermally conductive structure, or the electronic device, the sensor to output a value indicative of the temperature; and
   a controller to cause a drive system to eject the electronic device from the dock only after the value output by the temperature sensor indicates an external temperature of the electronic device is below a threshold.

2. The dock of claim 1, wherein the movable heat sink is to move from the second position to a third position relative to the dock during an ejection cycle.

3. The dock of claim 2, wherein the dock includes guide members to define a path along which the movable heat sink is to move from the first position to the second position and to the third position.

4. The dock of claim 1, wherein, following completion of an ejection cycle, the movable heat sink is to return to the first position.

5. The dock of claim 1, further including a cooling system to convectively transfer heat from the cavity when the movable heat sink is disposed in the first position.

6. The dock of claim 1, further including a movable cover, the movable heat sink integrated with the movable cover.

7. The dock of claim 6, further including:
   a drive system to move the movable cover and the movable heat sink relative to at least one of the electronic device and the dock.

8. The dock according to claim 1, further including the electronic device, the electronic device including a processing device.

9. The dock according to claim 8, wherein the electronic device includes a compute-card or a compute-stick.

10. A computing system, comprising:
an electronic device; and
a dock defining a cavity to receive the electronic device, the dock including:
a connector to communicatively connect with the electronic device when the electronic device is in the cavity and
a movable heat sink to move between at least: (a) a first position in which the movable heat sink is spaced apart from the electronic device, and a second position in which the movable heat sink is disposed to contact at least one of the electronic device or a thermally conductive structure carried by the electronic device;
a temperature sensor to sense a temperature of at least one of the movable heat sink, the thermally conductive structure, or the electronic device, the sensor to output a value indicative of the temperature; and
a controller to cause a drive system to eject the electronic device from the dock only after the value output by the temperature sensor indicates an external temperature of the at least one of the movable heat sink, the thermally conductive structure, or the electronic device is below a threshold.

11. The computing system of claim 10, wherein the movable heat sink is to move from the second position to a third position relative to the cavity during an ejection cycle.

12. The computing system of claim 11, wherein the dock includes guide members to define a path along which the movable heat sink moves from the first position to the second position and to the third position.

13. The computing system of claim 10, wherein, following completion of an ejection cycle, the movable heat sink is to return to the first position.

14. The computing system of claim 10, wherein the dock includes a movable cover, and the movable heat sink is one piece with the movable cover.

15. A method of conditioning an electronic device for ejection from a dock, the method comprising:
following receipt of an ejection input, moving a dock heat sink from a first position spaced apart from the electronic device to a second position abutting at least one of the electronic device or a thermally conductive structure associated with the electronic device to remove thermal energy from the at least one of the electronic device and the thermally conductive structure;
moving the dock heat sink away from the electronic device following attainment of an external temperature of the electronic device below a threshold temperature;
after attainment of the external temperature below the threshold temperature, presenting the electronic device for removal; and
returning the dock heat sink to the first position following removal of the electronic device from the dock.

16. The method of claim 15, further including operating a cooling system to transfer heat from the dock heat sink when the dock heat sink is disposed in the first position.

17. The method of claim 15, further including moving the dock heat sink and the electronic device along a path defined by the dock from the second position to a third position.

18. The dock of claim 1, wherein the movable heat sink includes at least one of copper, aluminum, an aluminum alloy, a copper alloy, an alloy of a plurality of metals, or a metal matrix composite.

19. The dock of claim 1, wherein the threshold is 50° C.

20. The dock of claim 1, wherein the controller is to maintain the movable heat sink in the second position for a predetermined period of time to ensure the external temperature of the electronic device ejected from the dock is below the threshold.

* * * * *

UNITED STATES PATENT AND TRADEMARK OFFICE
CERTIFICATE OF CORRECTION

PATENT NO. : 10,162,382 B2  
APPLICATION NO. : 15/269564  
DATED : December 25, 2018  
INVENTOR(S) : Nishi Yoshi Yoshifumi Page 1 of 1

It is certified that error appears in the above-identified patent and that said Letters Patent is hereby corrected as shown below:

In the Claims

Column 19, Line 15 (Claim 10): between "the electronic device, and" and "a second position" insert --(b)--

Signed and Sealed this  
Nineteenth Day of March, 2019

Andrei Iancu  
*Director of the United States Patent and Trademark Office*